April 4, 1939.  J. J. ALLISON ET AL  2,153,446
MACHINE FOR LEVELING LAND AND FORMING BORDERS
Filed April 20, 1938  3 Sheets-Sheet 2
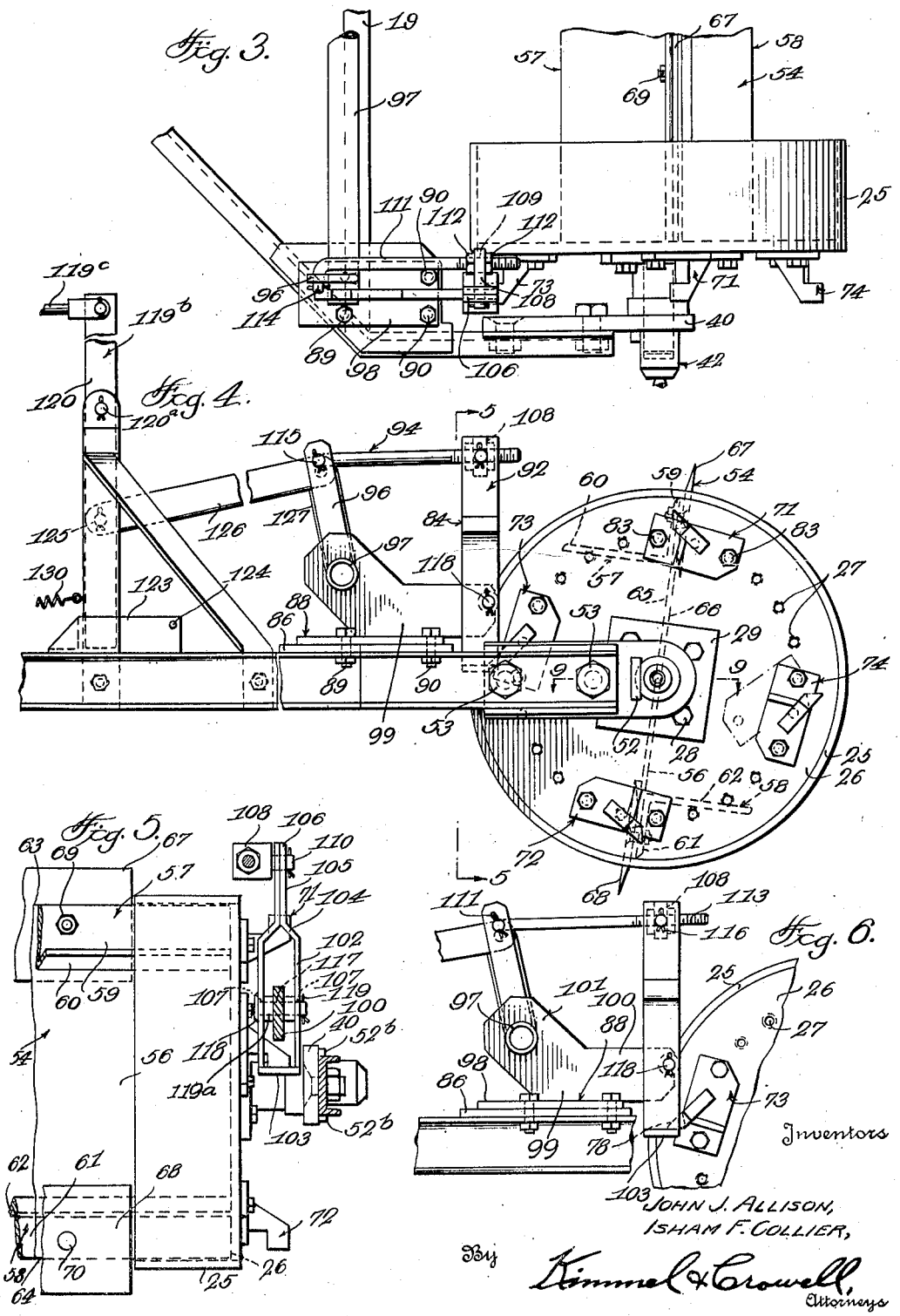

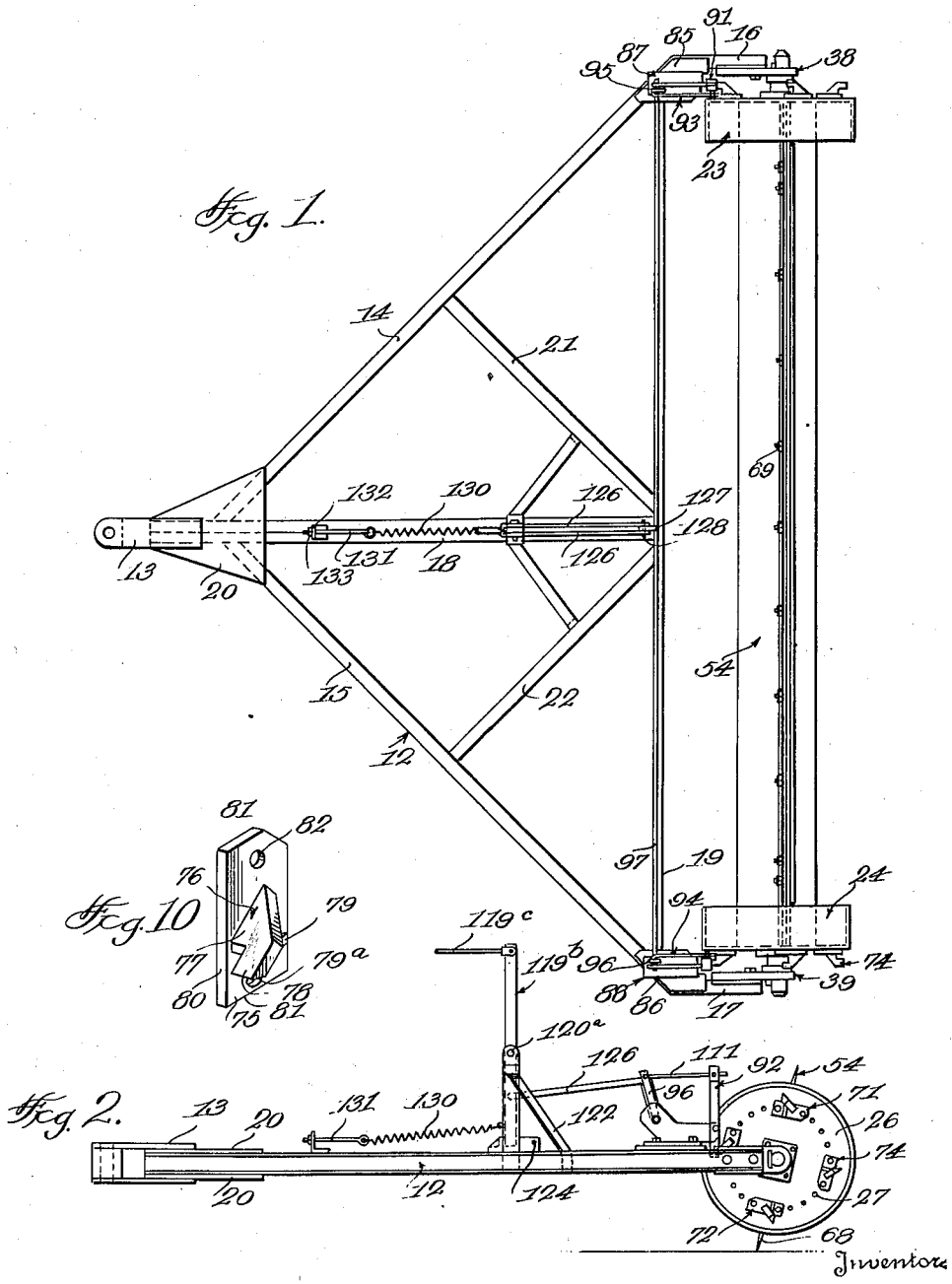

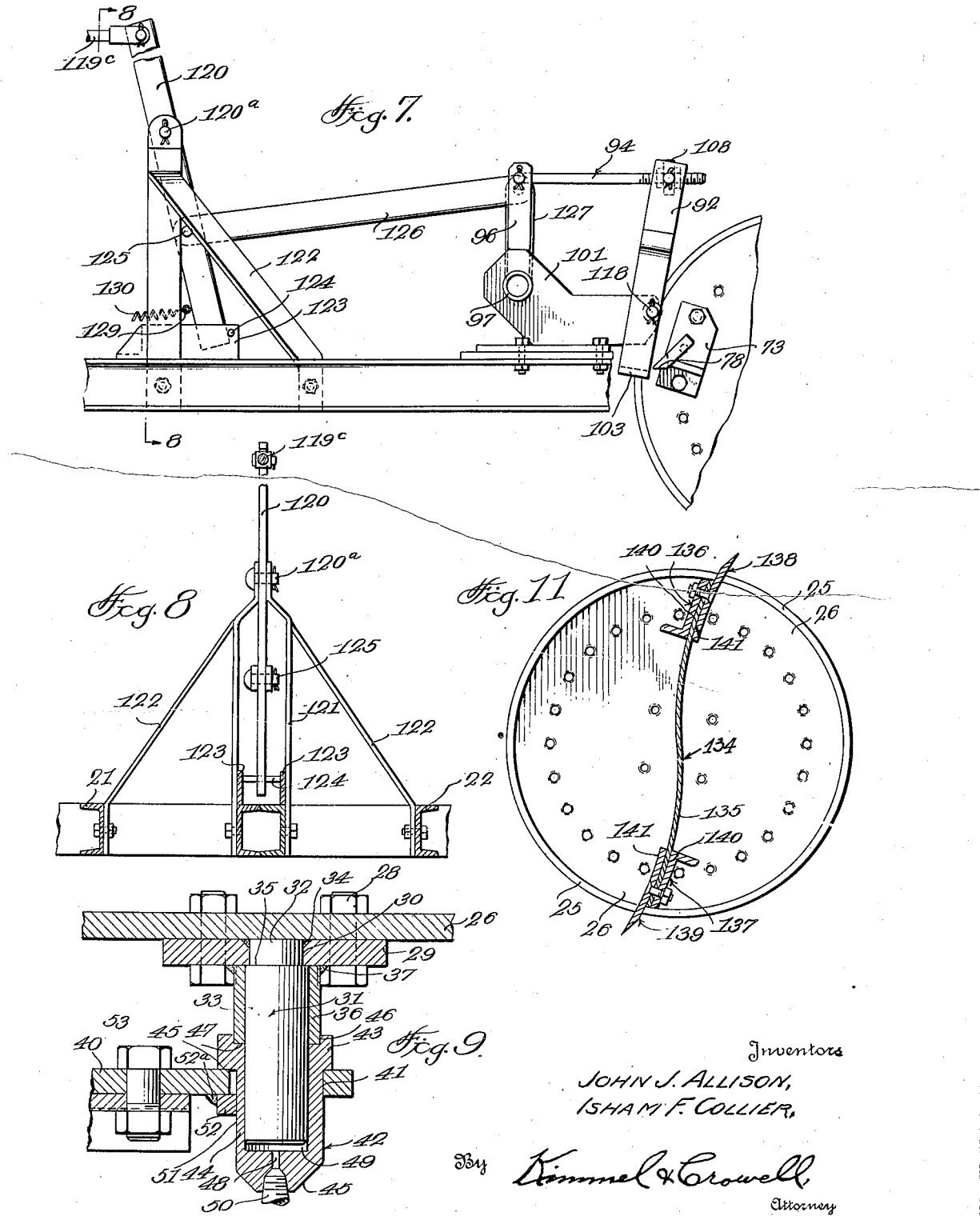

Patented Apr. 4, 1939

2,153,446

UNITED STATES PATENT OFFICE 2,153,446

MACHINE FOR LEVELING LAND AND FORMING BORDERS

John J. Allison, Chandler, and Isham F. Collier, Tempe, Ariz.

Application April 20, 1938, Serial No. 203,176

6 Claims. (Cl. 37—179)

This invention relates to a machine for leveling land and forming borders and is designed primarily for use in making borders in irrigated districts for soil erosion work, cleaning feed pens and barnyards, but it is to be understood that a machine, in accordance with this invention may be employed in any connection for which it may be found applicable, and the object of the invention is to provide, in a manner as hereinafter set forth a machine of the class referred to that may be traversed over the surface to be acted on by a light, as well as a heavy tractor and being so arranged whereby its operation will be under the control of the driver of the tractor with no extra assistance.

A further object of the invention is to provide, in a manner as hereinafter set forth a machine of the class referred to including a double edge scraper element and means disposed adjacent the ends of said element for releasably latching the edges of the latter successively in scraping position.

A further object of the invention is to provide, in a manner as hereinafter set forth, a machine including an intermittently revoluble scraper element having a pair of oppositely disposed scraper members for successively acting to perform a scraping function, a pair of normally stationary revoluble carriers for and between which said element is arranged, a set of keepers on each of the carriers, and a pair of latching devices for simultaneous association with selected keepers of said sets for selectively and releasably maintaining the scraper element in scraping and non-scraping positions.

A further object of the invention is to provide, in a manner as hereinafter set forth, a machine of the class referred to including an angularly adjustable, intermittently revoluble, releasably latched scraper element formed with a pair of successively active scraping edges and with said element functioning as a dumping means for the loads of dirt gathered thereby during the scraping action thereof.

Further objects of the invention are to provide, in a manner as hereby set forth, a machine for the purpose referred to which is simple in its construction, strong, durable, compact, readily assembled, thoroughly efficient in its use, conveniently controlled, automatic in its dumping action, capable of being expeditiously repaired when occasion requires and comparatively inexpensive to set up.

With the foregoing and other objects in view, the invention consists of the novel construction, combination and arrangement of parts as will be more specifically referred to and as are illustrated in the accompanying drawings herein is shown an embodiment of the invention, but it is to be understood that changes, variations and modifications may be resorted to which fall within the scope of the invention as claimed.

In the drawings:

Figure 1 is a top plan view of the machine,

Figure 2 is a side elevation with the machine disposed in scraping position,

Figure 3 is a fragmentary view in top plan and upon an enlarged scale of the rear portion of one side of the machine, Figure 4 is a fragmentary view in side elevation and upon an enlarged scale of the rear portion of one side of the machine, Figure 5 is a section on line 5—5, Figure 4, Figure 6 is a fragmentary view in side elevation illustrating a latching member in coactive relation with respect to a keeper, Figure 7 is a fragmentary view in side elevation and upon an enlarged scale of the intermediate portion of a side of the machine, Figure 8 is a section on line 8—8, Figure 7, Figure 9 is a detail in sectional plan, Figure 10 is a perspective view of a keeper, and Figure 11 is a vertical sectional view illustrating a modified form of scraper element.

The machine includes a body part 12 of framelike form adapted to be connected at its front, by a hitch 13 to a tractor not shown. The body part 12 is of substantially triangular contour in plan having its apex at the front of the machine. The body part 12 includes a pair of oppositely disposed rearwardly extending outwardly inclined side members 14, 15 having straight parallel rear end terminal portions 16 and 17 respectively, a central member 18 having its rear end disposed forwardly of the front ends of the portions 16, 17 and its front end arranged between the front ends of members 14, 15. The body part 12 includes a transversely extending rear or base member 19 arranged between the members 14, 15 in advance of and in proximity to the forward end of the said terminal portions 16 and 17, coupling plates 20 secured to the front ends of the members 14, 15, 18. To the coupling plates 20 the hitch 13 is attached. The body part 12 also includes forwardly extending oppositely disposed outwardly inclined brace members 21, 22 extending from the member 19 to the members 14, 15 respectively. The members 14, 15 are in the form of outwardly opening channel irons. The member 18 is formed from a pair of inwardly opening oppositely disposed channel irons (Figure 8). The members 14, 15, 18, 19 are suitably secured together preferably by welding.

The machine includes a pair of oppositely disposed revolubly mounted carriers 23, 24 of like form and each of which is formed of a horizontal annular body portion 25 and a circular head 26 integral with the inner face of and flush with the outer edge of said body portion. The head 26 is formed with a circular row of spaced openings 27 in proximity to its point of mergence with body portion 25. Anchored against the outer face of head 26, by the holdfast means 28 is a plate 29 (Figure 9) formed with a countersunk opening 30 aligning with the axis of the head 26. The countersink of opening 30 is on the inner face of plate 29. Abutting against the outer face of head 26 and extending through plate 29 is a trunnion 31 for the carrier. The trunnion is formed of two parts 32, 33 of different diameters. The part 32 of smallest diameter, is arranged in opening 30 and welded to plate 29 as at 34. The junction of parts 32, 33 provides the trunnion with a peripheral shoulder 35 which abuts the outer face of plate 29. The part 32 is of materially less length than part 33. Surrounding and of less length than part 33 is a sleeve 36 which abuts the outer face of plate 29 and is welded to the latter, as at 37. The carriers open inwardly.

Oppositely disposed bearing structures 38, 39 of like form are provided for the carriers 23, 24 respectively. The structures 38, 39 are anchored to and extend rearwardly from the rear terminal portions 16, 17 of the side members 14, 15 respectively of the body part 12. Each bearing structure includes a support 40 (Figure 9) arranged against the inner face of and extending rearwardly from a rear end terminal portion of a side member of body part 12. The support 40 in proximity to its rear end is formed with an opening 41 through which extends an inwardly opening tubular bearing member 42 of socket-like form. The member 42 is formed of an inner part 43 and an outer part 44 having a tapered outer end 45. The junction of the parts 43, 44 provides member 42 with a peripheral shoulder 45. The inner edge of part 43 has the inner portion thereof rabbeted, as at 46 to form an internal shoulder 47. The part 44 at its outer end portion has an axial opening 48 forming a lubricant supply duct communicating with the socket 49 provided by said member 42. Secured on the outer end of opening 48 is a lubricant cup 50. The said part 44 is arranged within and extends outwardly from opening 41. The shoulder 45 abuts the inner face of support 40. The outer end of sleeve 36 extends into the rabbeted portion 43 and abuts shoulder 47. One side of the part 44 has a peripheral flat facet 51 against which abuts a flat stop 52 positioned against the outer face of and welded to support 40, as at 52ª. The stop 52 coacts with facet 51 to arrest turning of member 42. The trunnion 31 extends from sleeve 36 into the socket 49 formed by member 42 and has its outer end permanently spaced from the outer end or base wall of the socket. The support 40 is secured against the inner face of the rear end terminal portion of a side member of body part 12 by a plurality of spaced holdfast devices 53 and extends above and depends from such terminal portion. The heads 26 of the carriers are spaced inwardly from the inner ends of the bearing members 42. The support 40 is formed with spaced parallel ribs 52ᵇ which are arranged against the top and bottom edges of a rear terminal portion of a side member of the body part 12.

The machine includes a scraper element which may be of the straight form as indicated at 54 on Figures 1, 2, 3, 4 and 5 or of compound curvature as indicated at 55, Figure 11.

The scraper element 54 includes a holder formed of an oblong straight plate 56 and a pair of oppositely disposed spaced angle-shaped reinforcements 57, 58. The width of plate 56 corresponds to the inner diameter of the body portions of the carriers. The end terminal portions of plate 56 extend into the body portions of and has the end edges thereof abut the inner faces of the heads of the carriers. The lengthwise edges of plate 56 abut the inner faces of the body portions of the carriers. The reinforcement 57 is formed of two legs 59, 60 disposed at right angles to each other and with reference to Figure 4 the leg 59 has its inner side merging into the inner side of the leg 60. The reinforcement 58 is formed of two legs 61, 62 disposed at right angles to each other and with reference to Figure 4, the leg 61 has its inner side merging into the inner side of leg 62. The lengthwise edges of plate 56 are indicated at 63, 64 (Figure 5). The side faces of plate 56 are indicated at 65, 66. The leg 59 is secured throughout to one of the lengthwise marginal portions of the face 65 and has its outer side edge flush with the edge 63 of the plate 56. The leg 61 is secured throughout to one of the lengthwise marginal portions of the face 66 and has its outer side edge flush with the edges 64 of the plate 56. The ends of the plate 56, the reinforcements 57, 58, as well as the end terminal portions of the edges 63, 64 of plate 56 and the end terminal portions of the outer edges of the legs 59, 61 of the reinforcements 57, 58 are welded or otherwise secured to the inner faces of the carriers. The element 54 also includes a pair of oppositely disposed straight scrapers 67, 68 arranged between the carriers 23, 24 and of less length than the length of plate 56. The scraper 67 has its inner part positioned against the other marginal portion of the side face 66 and has its outer part disposed in laterally extended relation with respect to the edge 63 of plate 56. The inner part of scraper 67 is detachably connected to plate 56 and leg 59 of reinforcement 57 by spaced holdfast means 69. The scraper 68 has its inner part positioned against the other marginal portion of the side face 65 of and has its outer part disposed in laterally extended relation with respect to the edge 64 of plate 56. The inner part of scraper 68 is detachably connected to plate 56 and leg 61 of reinforcement 58 by spaced holdfast means 70 in the same manner as scraper member 67.

The machine includes two sets of adjustable spaced keepers, each set being adjustably connected to the outer face of a head of a carrier. As shown each set consists of four keepers. The keepers of one set are oppositely disposed with respect to the keepers of the other set. The keepers of each of the sets are of like form and disposed in spaced relation. A set of keepers is clearly shown in Figure 4 and the keepers of a set are arranged in pairs. The keepers of one pair are indicated at 71, 72 and those of the other pair at 73, 74. Each keeper (Figure 10) consists of a base plate 75 having formed integral with its outer face a keeper member 76. The latter consists of a shank 77 formed with a nose 78 disposed at an angle to the outer end thereof. A reinforcing web 79 is integral with the outer face of plate 75 and one side of shank 77. The latter at its inner end merges into the outer face of plate 75. The outer end of nose 78 is beveled as at 79ª. The nose 78 extends beyond the outer lengthwise edge 80 of plate 75. The latter is of a length that when attached to a carrier head it will span three of the openings 27 and in proximity to its end edges 81 is formed with openings 82 for registry with the two outer openings of the three openings 27 which it spans. The plate 75 is detachably connected to a carrier head by spaced holdfast means 83 coacting with the registering openings 27, 82. When the carriers are intermittently revolved for the purpose of bringing the scraper members 67, 68 successively into action, or rather to make the scraper element 54 active on each half revolution of the carriers, the keepers will be arranged as shown in Figure 4, that is to say the keepers 71, 72 will be diametrically opposed with respect to a carrier head and the keepers 73, 74 will also be diametrically opposed with respect to a carrier head. The keepers 73, 74 will be arranged between and each will be spaced equi-distant from the keepers 71, 72. The pair of keepers 73, 74 are employed in connection with a latching mechanism to be referred for successively and releasably retaining the scraper members in active position. The pair of keepers 71, 72 are selectively employed in connection with said latching mechanism for releasably maintaining the scraper members in inactive position. The adjusting of the keepers of the set controls the angular position of the scraper element. If it be desired that the scraper element act after one complete revolution of a carrier but one keeper will be employed. When operating the scraper element twice during one revolution of the carrier the keeper 71, 72 may be removed, if not the latching mechanism to be referred to will be held in unlatching position until keeper 71 or 72 has been cleared and then released for coaction with a keeper 73, 74. Preferably the machine will be used with a set of four keepers arranged in the manner as shown in Figure 4, but it is to be understood that the number of keepers used in connection with the carriers, as well as the position of the keepers may be as desired. Instead of removing certain of the keepers, when desired, the keepers which are not to be used may be swung to the dotted line position Figure 4 for the purpose of clearing the latching mechanism.

The latching mechanism which coacts with keepers on the carriers and also with selected keepers of the sets of keepers to provide for the positioning of the scraper element in a manner as referred to is generally indicated at 84, and is mounted on the body part 12 of the machine. The mechanism 84 is normally held in latching position by a spring controlled shifting or operating mechanism to be referred to, includes a pair of oppositely disposed supporting plates 85, 86 which are mounted on the side members 14, 15 and extend upon the rear end terminal portions 16, 17 to a point spaced from the forward ends of the supports 40, a pair of upstanding brackets or supports 87, 88 mounted on the plates 85, 86 respectively, holdfast means 89 for securing side members 14, 15, plates 85, 86 and brackets 87, 88 together, holdfast means 90 for securing plates 85, 86 and brackets 87, 88 together, a pair of upstanding latching members 91, 92, oppositely disposed adjustable pivotal suspensions 93, 94 for the latching members 91, 92 respectively, upstanding crank arms 95, 96 for the shifting of the suspensions 93, 94 respectively and a rock shaft 97 common to the said crank arms.

The brackets 87, 88 are of like form and each of which consists of a base 98 formed centrally of its upper face with an upstanding arm 99 formed of a rearwardly directed part 100 and a forwardly extending upwardly inclined part 101. The part 100 extends rearwardly beyond the base 98 and a plate 85 and is disposed on its lower lengthwise edge.

Each latching member consists of a single strap-like body of metallic material of the desired length and width and shaped in a manner to form the latching member with an upstanding somewhat elongated skeleton body part 102 having a squared lower closed end 103 and a closed tapered upper end 104, and a hanger part 105 merging at its lower end into the upper end of body part 102 and formed near its upper end with an opening 106. The sides of body part 102 are formed substantially centrally thereof with aligned openings 107.

The suspensions 93, 94 are of like form and each includes a slidably adjustable rectangular block 108 disposed at right angles to the inner side of hanger part 105 of a latching member. The block 108 is formed with a threaded opening 109 (Figure 3) and a pivot 110 (Figure 5) extending from the outer end thereof and passing through opening 106 of the hanger part 105 of a latching member. Each suspension includes a combined adjusting and coupling bar 111 for the block 108. The bar 111 has threaded engagement with the wall of opening 109. After block 108 has been adjusted on bar 111, it is retained in its adjusted position by the locknuts 112 engaging bar 111. The latter has its rear terminal portion threaded as at 113 for engagement with the wall of opening 109 and the nuts 112. The forward end terminal portion of bar 111 is angularly disposed as at 114 and extends through an opening 115 formed in and near the upper end of a crank arm 95 or 96. Cotters 116 are employed for connecting the bars 111 to the crank arms 95, 96. The pivots 110 carried by the blocks 108 are connected to the hanger parts 105 of the latching members by cotters 116. The parts 100 of the brackets 87, 88 extend into the body parts 102 of the latching members and are provided with openings 117 (Figure 5) which align with the openings 107 and in the said sides of the said body 102. Extending through the aligned openings 107, 117 are headed pivots 118 for the latching members. Cotters 119 are employed for connecting pivots 118 to the latching members. The parts 101 of the brackets 87, 88 act as combined bearings and supports for the rock shaft 97. Spacing collars 119ª for the parts 100 of the arms 97 are carried by the pivots 118. The closed bottoms of the latching members, when the mechanism 84 is shifted to latching position, coacts with the noses 78 of a pair of selected keepers on the carriers for the purpose of arresting the revolving movement of the carriers after these latter have been released to permit of the scraper element dumping and moving to active position, or in other words, after the carriers have been released and they revolve in the direction of the draft of the machine, the latching mechanism is shifted in a direction to position the closed bottoms of the latching members in the path of the aforesaid noses 78 to engage them whereby further revolving of the carriers and scraper element will be arrested. The adjustment of the blocks 108 provide for increasing or decreasing the extent of the engagement of the latching members with the noses of the selected keepers to provide for a quick or a retarded release or engagement of the latching members with the noses of the selected keepers. The latching members are shifted in unison in a direction to engage or from engagement with the noses by the shifting or operating mechanism for the latching mechanism. The operating mechanism is under control of the driver of the tractor.

The operating mechanism is generally indicated at 119b, is spring controlled and includes a pull member 119c of a length to permit of the driver of the tractor conveniently handling it when desired. The mechanism 119b includes an upstanding lever 120 mounted intermediate its ends on a pivot 120a carried by and arranged near the upper end of a vertically disposed supporting structure 121 of frame-like form. The lever 120 depends into the structure 121 and its normal position is as shown in Figure 4. The structure 121 is secured to the sides of the central member 18 of the body part 13 of the machine. Oppositely disposed brace members 122 are provided for the structure 121. Secured upon the said central member 18 and arranged within and extending forwardly and rearwardly with respect to structure 121 is a pair of spaced parallel plates 123 disposed on their lower lengthwise edges. The plates 123 are secured to the structure 121 and to the member 18 and have connected thereto in proximity to their upper rear corners a stop bar 124 extending across and spaced from the upper face of member 18. Pivotally connected to the lever 120, below the top of structure 121 as at 125 are the forward ends of a pair of parallel actuating links 126 for a crank arm 127 fixed to the rock shaft 97. The rear ends of the links 127 are pivotally connected to the upper end of crank arm 127, as at 128. Attached to the lower portion of lever 120 as at 129 is the rear ends of a forwardly extending controlling spring 130 therefor. The spring 130 has its forward end attached to the rear end of an adjustable tensioning bar 131 therefor. The bar 131 is slidably mounted in a support 132 secured upon the top of member 18 and carries an adjusting and stop nut 133. The latter provides means in connection with the bar 131 for adjusting the tension of spring 130. The stop bar 124 acts to limit the extent of the lever 120 when the latter is shifted in a direction to move the latching members to release the selected keepers with which they engage.

It will be assumed that the latching members are engaged with the keepers on the carriers 23, 24 whereby scraper member 58 is active. Now if it be desired to dump the dirt gathered by the scraper member 58, the pull member 119c is pulled forwardly to shift mechanism 119b to an extent to release the latching members from engagement with the keepers 73 which allows for the carriers and scraper element to revolve in the direction of the draft of the machine whereby the dirt will be dumped. When pull member 119c is pulled forwardly lever 120 and the latching members will be moved to the position shown in Figure 7 and stop 124 will arrest further shifting. The mechanisms 84, 119b are held in the position (Figure 7) until keepers 71 pass below the latching members, after which pull member 119c is released and the operation of spring 130 will be such to restore lever 120 and the latching members to the position shown in Figure 4. The latching members will then be arranged in the path of the keepers 74 and latch the carriers and scraper element whereby the scraper member 67 will be disposed and latched in active position, similar to the position in which scraper member 68 was arranged in before the forward pull of pull member 119c. Now it will be assumed that the machine will be in the position shown in Figure 4 and it is desired to hold the scraper element in inactive position, the latching members are moved from engagement with the keepers 73 and then instantly returned to be in the path of the keepers 71, and when these latter are engaged with the latching members the scraper element will be latched in a position at right angles to the showing thereof in Figure 4 whereby both scraper members will be releasably held in inactive position.

The modified form shown by Figure 11 will be the same as the form illustrated by Figures 1 to 10, with this exception the scraper element 55 will be of curved form. The holder 135 of element 134 will be of compound curvature, the reinforcements 136, 137 oppositely disposed and of curved contour in transverse cross section and the scraper members 138, 139 oppositely disposed and of curved contour in transverse cross section. The curvature of the legs 140 of the reinforcement, the curvature of the inner parts 141 of the scraper members 138, 139 will conform to the marginal portions of the side faces of the holder 135. Otherwise than as stated the construction of the modified form 141 (Figure 11) will be the same as the other form disclosed.

What we claim is:

1. In a mobile machine of that type including a body part and a controllable revoluble scraping and dumping structure carried by and spaced from said body part, said machine comprising a pair of sets of spaced keepers adapted for connection to, selectively adjustable relative to and disposed in laterally extended relation with respect to the ends of said structure, a pair of spaced upstanding parallel oppositely shiftable latching members disposed in the path of and for coaction with selected keepers for selectively controlling intermittent successive complete revolutions and intermittent successive part revolutions of said structure to provide for alternate successive scraping and dumping actions of the latter, upstanding supports adapted to be secured to said body part, said supports extending into and having means at the rear thereof for pivotally supporting said members intermediate the ends of the latter, and spring controlled shifting means common to said members adapted to be carried by said body part, said spring controlled means being journaled in the front of said supports and pivotally connected to the upper ends of said members.

2. A mobile machine for the purpose referred to comprising a revolubly supported combined scraping and dumping structure having each of its ends formed with a circular row of spaced openings, a set of spaced selectable keepers positioned against the outer surface of each of said ends, means coacting with the keepers and said openings for adjustably connecting the keepers to the ends of said structure, each of said keepers including a shank disposed in angular relation with respect to said structure and a nose extending at an angle to the shank, a pair of spaced upstanding parallel oppositely shiftable latching members having skeleton portions disposed in the path of said noses for coaction with selected keepers for selectively controlling intermittent successive complete revolutions and intermittent successive part revolutions of said structure to provide for alternate successive scraping and dumping actions of the latter, fixed supports extended into said portions for pivotally supporting said members intermediate the ends of the latter, and spring controlled means for shifting said members in unison, said spring controlled means being journaled in the said supports and pivotally connected to the upper ends of said members.

3. In a mobile machine of that type including a body part and a controllable revoluble scraping and dumping structure carried by and spaced from said body part; a pair of sets of spaced keepers adapted for connection to, selectively adjustable relative to and disposed in laterally extended relation with respect to the ends of said structure, a pair of spaced upstanding parallel oppositely shiftable latching members disposed in the path of and for coaction with selected keepers for selectively controlling intermittent successive complete revolutions and intermittent successive part revolutions of said structure to provide for alternate successive scraping and dumping actions of the latter, upstanding supports adapted to be secured to said body part, said supports extending into and having means at the rear thereof for pivotally supporting said members intermediate the ends of the latter, and spring controlled shifting means common to and for operating said members in unison, said shifting means adapted to be carried by said body, journaled in the front of said supports and being pivotally and adjustably connected to the upper ends of said members.

4. A mobile machine for the purpose referred to comprising a revolubly supported combined scraping and dumping structure having each of its ends formed with a circular row of spaced openings, a set of spaced selectable keepers positioned against the outer surface of each of said ends, means coacting with the keepers and said openings for adjustably connecting the keepers to the ends of said structure, each of said keepers including a shank disposed in angular relation with respect to said structure and a nose extending at an angle to the shank, a pair of spaced upstanding parallel shiftable latching members having skeleton portions disposed in the path of said noses for coaction with selected keepers for selectively controlling intermittent successive complete revolutions and intermittent successive part revolutions of said structure to provide for alternate successive scraping and dumping actions of the latter, fixed supports extended into said portions for pivotally supporting said members intermediate the ends of the latter, and spring controlled means for shifting said members in unison, said spring controlled means being journaled in the said supports and being pivotally and adjustably connected to the upper ends of said members.

5. In a mobile machine for levelling land and forming borders and of that type including a revoluble combined scraping and dumping structure provided at its ends with spaced selectable keepers, the combination of a pair of spaced parallel upstanding oppositely shiftable latching members having portions disposed into the path of and for coacting with selected keepers for selectively controlling intermittent successive complete revolutions and intermittent successive part revolutions of said structure to provide for alternate successive scraping and dumping actions of the latter, upstanding supports having their ends positioned in said latching members above said portions, means extending through the rear ends of said supports and the latching members above said portions for pivotally supporting said members intermediate their ends, and spring controlled means common to said members for shifting them in unison, said means including a rock shaft journaled in said supports and parts extended from the shaft for pivotally and adjustably connecting the upper ends of the members to said means.

6. In a mobile machine for the purpose set forth, a revoluble combined scraping and dumping structure, a set of spaced adjustable plates positioned against the outer surface of and disposed in angular relation with respect to the axis of each end of said structure, means coacting with each plate and an end of said structure to provide a pair of spaced connections for each plate for detachably securing the latter in its adjusted position to said structure, a laterally extending shank integral with and disposed diagonally with respect to the outer face of each plate, each of said shanks being formed at its outer end with a nose disposed at an angle to and projecting beyond an edge of the plate, the angle of said nose with respect to said edge being different from that of the angle of the plate with respect to said axis, a pair of spaced upstanding shiftable elements pivotally supported intermediate their ends and having their lower ends coacting with selected noses for controlling the revolving and scraping actions of said structure, and spring controlled means operating said elements in unison for shifting the lower ends of the elements towards and from coaction relation with the selected noses, said spring controlled means being arranged forwardly of said structure and having substantially horizontally disposed pivoted elevated rear parts pivotally connected to the upper ends of said elements.

JOHN J. ALLISON.
ISHAM F. COLLIER.